March 22, 1927.
A. Y. DODGE
1,622,133
PRESSED BRAKE SHOE
Filed Dec. 8, 1924    3 Sheets-Sheet 1
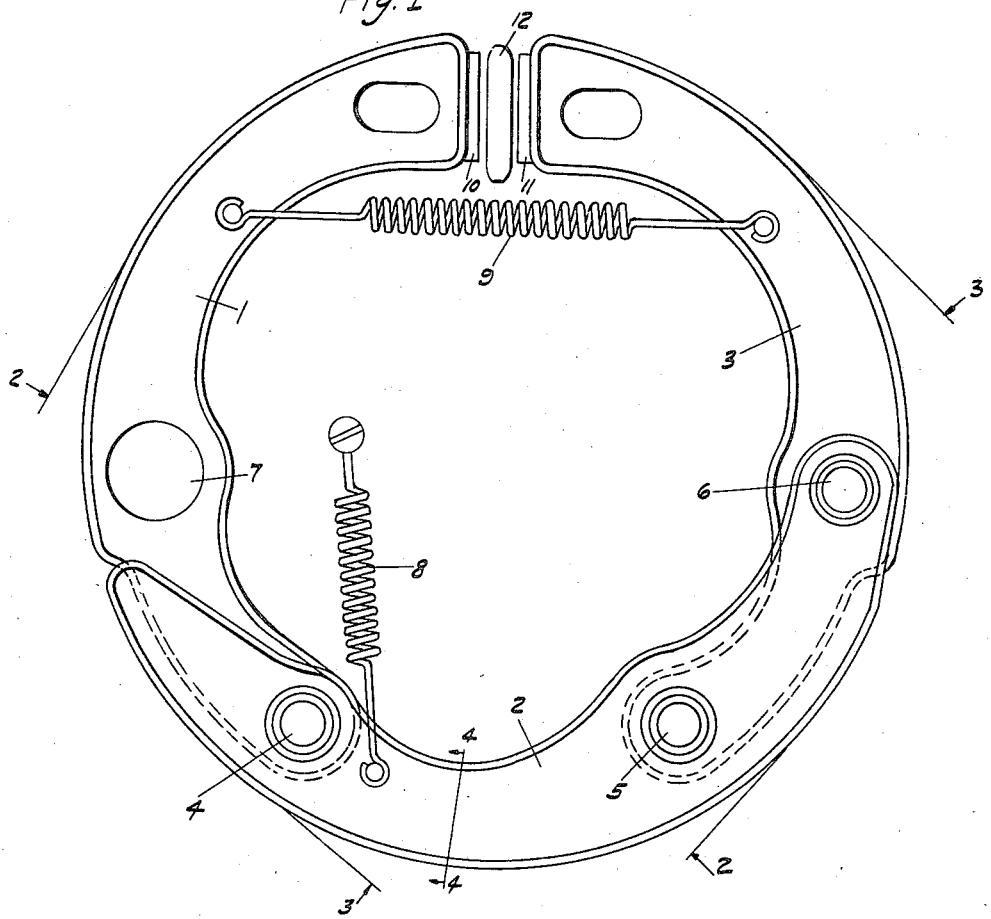
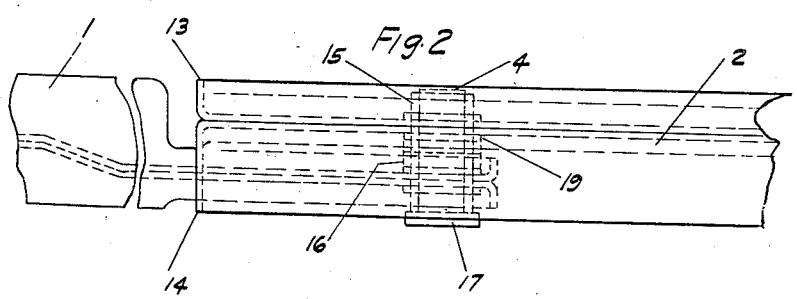
INVENTOR
ADIEL Y. DODGE
BY
A. D. T. Libby
ATTORNEY March 22, 1927.  1,622,133
A. Y. DODGE
PRESSED BRAKE SHOE
Filed Dec. 8, 1924     3 Sheets-Sheet 2
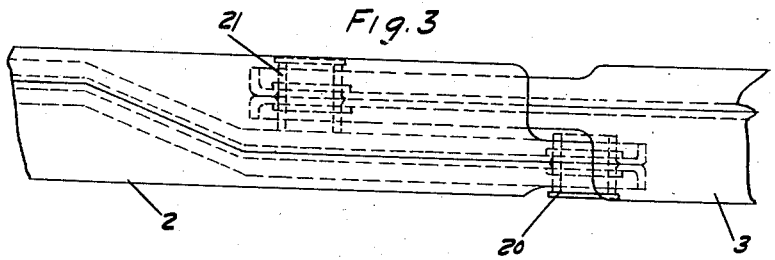
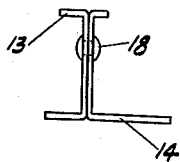 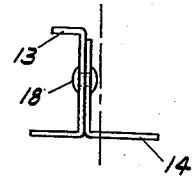 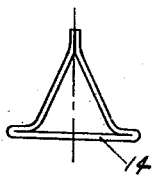
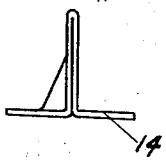 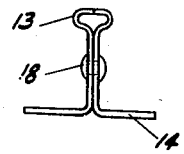 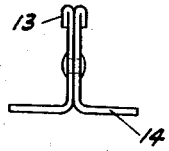
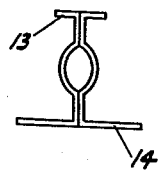 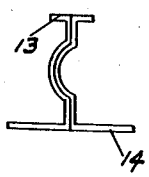
INVENTOR
ADIEL Y. DODGE
BY
ATTORNEY March 22, 1927.
A. Y. DODGE
1,622,133
PRESSED BRAKE SHOE
Filed Dec. 8, 1924
3 Sheets-Sheet 3
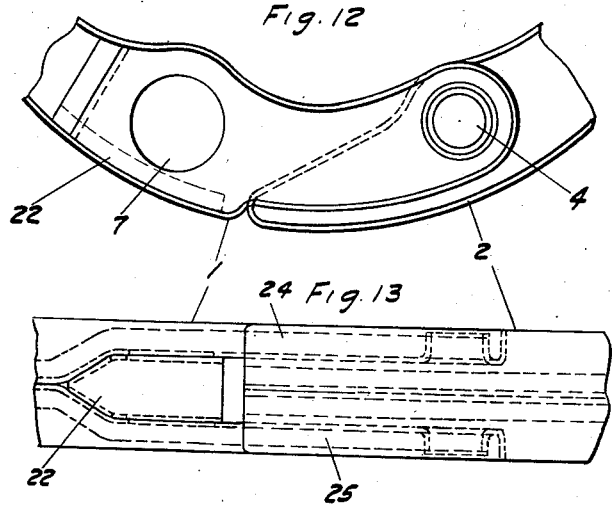
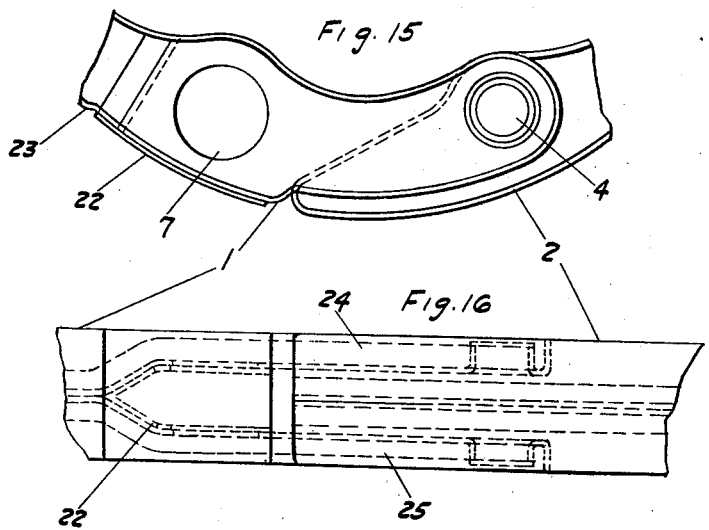
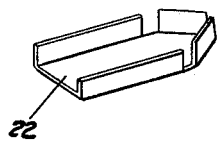
INVENTOR
ADIEL Y DODGE
BY
A. D. J. Libby
ATTORNEY Patented Mar. 22, 1927.

1,622,133

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

PRESSED BRAKE SHOE.

Application filed December 8, 1924. Serial No. 754,711.

This invention relates to shoes for brakes, especially brakes of the internal expanding type, and is illustrated as embodied in several forms of shoes for an automobile brake. An object of the invention is to provide an inexpensive, but relatively light and strong, shoe by forming it of pressings or stampings of sheet metal, and most of the features of novelty relate to the design of the shoe to permit the successful utilization of this material.

A very important one of these features has to do with so forming the shoe, preferably by securing together back to back a pair of channel or angle section stampings, that there is at one end of the shoe a pivot arm offset within the curve of the shoe and arranged at one side of the central plane of the shoe, or a pair of such arms on opposite sides of that plane, to overlap the end of an adjacent shoe of the brake. In one desirable embodiment, the arm is formed as a continuation of the composite stiffening web formed by the backs of the two stampings, the web being, if desired, in the central plane of the shoe throughout most of its length and then deflected to one side of that plane.

As the greatest crushing or buckling strain comes at the inner edge of the shoe, I consider it important to reinforce the stamping or stampings making up the shoe, along that edge, preferably by flanging them outwardly, thus giving the shoe the general sectional form of an I-beam. Thus in the illustrated forms, each shoe is built up of elements or stampings of cup-shaped form, each having its bottom adapted to form part of the stiffening web of the shoe and having a flange extending entirely around the bottom or web portion, part of the flange being cylindrical and adapted to form approximately one-half of the friction face of the shoe.

Other features of novelty relate to an arrangement of a thrust plate, to be engaged by a cam or the like, and which transmits thrust to both sections or stampings forming the shoe; and to other novel and desirable particular constructions which will be apparent from the following description of several illustrative embodiments shown in the accompanying drawings, in which:

Figure 1 is a side elevation showing three brake shoes forming a complete braking unit, the drum not being indicated.

Figure 2 is a view of Fig. 1 between the lines 2—2 showing how the primary and secondary shoes are connected.

Figure 3 is a view of Fig. 1 between the lines 3—3 showing how the shoes are formed at their anchor ends so that they may function without interference.

Figure 4 is a view taken on the line 4—4 of Fig. 1, while

Figures 5 to 11 inclusive show sections of alternative forms of constructing the pressed brake shoes, and all corresponding to Fig. 4.

Figure 12 is a side elevation of a modified form of the joint end of two shoes.

Figure 13 is a plan view of Fig. 12.

Figure 14 is a detail of a reinforcing member used in the construction shown in Figs. 12 and 13.

Figure 15 is a view similar to Fig. 12 showing a further modified form of construction while Figure 16 is a plan view of Fig. 15.

In the drawings, 1 is a primary shoe, 2 the secondary shoe and 3 the auxiliary shoe; the construction being such that the shoes 1 and 3 are identical in construction. The primary shoe 1 is pivoted to the secondary shoe 2 by means of a joint 4 that is entirely independent of any support member. The present application relates to the structure of the brake shoes, the illustrated brake in which these shoes may be used being covered by my earlier and copending application 723,836, filed July 2, 1924, and by my continuing application 64,538, filed October 24, 1925.

As shown in Fig. 4 the shoe 2 is preferably made up of two stampings in the form of channels 13 and 14 having their webs placed back to back and riveted together by a series of rivets 18, or line welded, or otherwise securely fastened one to the other. As will be seen in the section, Fig. 4, the flanges are unequal, so that the stiffening web of the shoe is at one side of the central plane of the shoe, and two of them constitute the face of the brake shoe on which the brake lining may be attached in any satisfactory way as by rivets.

While the construction of the brake shoes may take any of the forms shown in Figs. 5 to 11 inclusive, one of the principal things involved in the construction is the offsetting of the web portion of the channel or T shaped members in order to provide pivots for the shoes. The articulated joint 4 is more clearly shown in Fig. 2 wherein two headed bushings 15 and 16 are placed with the heads of the bushings together, the bushing 15 being positioned in holes through the web portions of the members 13 and 14, as the holes for these bushings are punched preferably to turn some of the metal outward, as indicated at 19, thereby forming a seat for the bushings. The bushing 16 is positioned in the web of the members constituting the brake shoe 1, and the pivot pin 17, is seated in the two bushings, being held in place by the head of the pin 17 engaging through a rubbing contact with the backing plate to which the spring 8 is attached at one end for the purpose of restoring brake shoe 2 to its normal position after the brakes have been released. The brake shoes 1 and 3 are constructed with a hole 7 therein which hole is of sufficient diameter to allow proper clearance for the pivot pin 6 which passes through the bushing 20 and is carried by the anchor plate so that the free movement of the brake shoe 3 is obtained about its pivot point 5. This pivot pin being positioned in the bushing 21 of the brake shoe 3. Each of the brake shoes 1 and 3 is preferably provided with hardened cam engaging members 10 and 11 which are adapted to be acted on by any suitable actuating means such as a cam 12. A spring 9 is utilized for restoring shoes 1 and 3 to their normal position after the brakes have been released. It will be easily understood from a study of the drawings that the brake shoes herein described may be very easily made with extremely few operations and these of an inexpensive character, that is to say, blanking and forming operations are always cheaper than machine operations, such as milling and screw machine work. It will be understood that the webs of the shoes may be provided with a series of holes to reduce the weight without sacrificing strength. The novel channel-section stampings or elements of which the shoe is built up are of relatively simple cup-shaped form, the bottom of the cup forming one half of the stiffening web of the shoe, and part of the continuous surrounding flange being cylindrical and serving to form approximately one-half of the friction face of the shoe. These channel members or stampings may be of different depths at different points in their lengths, to give the desired deflection of the stiffening web of the finished shoe. Thrust plate 10 or 11 is secured to these surrounding flanges of the two elements forming the corresponding shoe, where the flanges cross the end of the shoe, and thus transmits brake-applying thrust to both of the elements or sections of the shoe.

By utilizing one shoe in two positions I have obtained all of the advantages of a self-energizing type of brake and an independent brake by the construction of only two shoe units, and while I have shown and described some of the preferred forms of my invention, I do not wish to be unduly limited in the interpretation of my invention or the scope of the appended claims, and while I have mentioned the fact that my present construction obviates the necessity for bifurcating any of the shoes, yet, it is to be understood that the shoes may be readily bifurcated as shown in Figs. 12, 13, 15 and 16 wherein the articulated joint 4 with fragmentary ends of the shoes 1 and 2 are indicated. The web portions of the shoe 1 are spread apart forming a fork as shown in Fig. 13, and when this construction is utilized, I prefer to use a reinforcing member 22 (see Fig. 14) which is placed between the forks and preferably spot welded to the web portions of the shoe—the flat portion of the member 14 forming a continuation of the face of the brake shoe 1. In Figs. 15 and 16 the construction is similar, except, that shoe 1 is pressed inwardly at 23 and a flat and reinforced member or plate 22 is used to form a continuation of the face of the brake shoe. When this bifurcated construction is used it will be readily seen that the part of the shoe 2 which carries the pivot 6 passes between the forked ends 24 and 25.

This bifurcated shoe is not claimed specifically in this application, as it was covered by a later application which was issued as Patent No. 1,567,716.

Having thus described my invention what I claim is:

1. A brake shoe composed of pressed metal and having a stiffening portion extending inwardly from the shoe face and having a portion of such extension arranged near the perpendicular center line through the shoe face and another portion at one side of the center, to permit overlapping adjacent shoes.

2. A brake shoe having an arcuate friction part, and having a stiffening web extending throughout the length of the friction part and at the end of the friction part projected at one side of the central plane of the shoe as a pivot arm arranged to overlap the stiffening web of an adjacent shoe, and offset within the curve of the friction part to clear the end of the friction part of said adjacent shoe.

3. A brake shoe composed of two metal portions stamped in the form of channels, one of said portions having unequal flanges, said channels being placed so their webs are back to back and their flanges forming the shoe face with means for fastening said portions securely together, the inequality of the flanges serving to position the webs at one side of the center of the shoe, at least at the end of the shoe, to overlap the end of an adjacent shoe.

4. A brake shoe having an arcuate friction part, and having a stiffening web extending in the central plane of the shoe throughout the greater part of the length of the friction part and at the end of the friction part offset from the central plane and projected at one side of the central plane of the shoe as a pivot arm arranged to overlap the stiffening web of an adjacent shoe, and offset within the curve of the friction part to clear the end of the friction part of said adjacent shoe.

5. A brake shoe having an arcuate friction part, and having an inner stiffening web extending from one end of the friction part in the same plane nearly to the other end of the friction part, then deflected at an acute angle partly across the friction part, and then continued parallel to its first plane and projected beyond the end of the friction part.

6. A brake shoe having a thrust plate at one end and a stiffening web projecting at the opposite end of the shoe at one side of the central plane of the shoe.

7. In a vehicle brake, brake shoes comprising at least two parts of substantially channel form in cross section, the webs of said parts being connected securely together so the flanges form the face of the shoes, the position of said webs being variable with respect to the center plane of said face to permit overlapping adjacent shoes.

8. For a vehicle, a relatively light but strong internal expanding brake shoe, comprising web and flange portions securely fastened together along the web portions while the flange portions form the face of the brake shoe, said web portions having bushings mounted therein for pivot or anchorage purposes, and the part of the web portions having the bushings being displaced from the center of the shoe to overlap the end of an adjacent shoe.

9. For a vehicle, a relatively light but strong internal expanding brake shoe, comprising a plurality of stamped parts having web and flange portions securely fastened together along the web portions while the flange portions form the face of the brake shoes, said web portions having bushings mounted therein for pivot or anchorage purposes, and said web portions being off-set from a central position for the purpose of overlapping an adjacent shoe.

10. For a vehicle, a relatively light but strong internal expanding brake comprising a plurality of brake shoes, each shoe consisting of a plurality of stamped parts having web and flange portions securely fastened together so the flange portions form the face of the brake shoe, and said web portions of one of the shoes being deflected to form a part overlapping the end of the adjacent shoe.

11. A brake shoe composed of two stamped metal parts connected together to form an I-beam section, two of the oppositely-extending flanges of the section serving as a cylindrical support for the brake lining, and the other two flanges forming oppositely-extending stiffening reinforcements generally parallel to said support.

12. A brake shoe comprising two sections, each having a generally plane web with a continuous flange extending entirely around its edge, and the two sections secured back to back with the webs in contact with each other.

13. A brake shoe comprising two sections, the sections having substantially radial transverse flanges at the end of the shoe, and a wear plate secured to the two flanges and transmitting brake-applying thrust to both sections.

14. A brake shoe comprising two sections, the sections having webs flanged at their inner edges and extending radially of the shoe, and a flat hardened wear plate secured to the end of the shoe and transmitting brake-applying thrust to the ends of the webs.

15. A brake shoe comprising two separate sections secured together and reinforced by flanges at their inner edges, and a flat wear plate, directly engaging the ends of both sections to transmit thrust thereto.

16. A brake shoe comprising two sections, each including a central web and an outwardly-extending cylindrical flange, the sections being arranged with the two webs in engagement from one end of the shoe to the other to form the web of the shoe, and both webs being arranged at one side of the center of the shoe at one end to permit overlapping an adjacent shoe.

17. A brake shoe comprising two sections, each including a central web and an outwardly-extending cylindrical flange, the sections being arranged with the two webs in engagement from one end of the shoe to the other to form the web of the shoe, and both webs being deflected to one side of the center of the shoe at one end, to permit overlapping an adjacent shoe, and being elsewhere substantially in the center of the shoe.

18. A brake shoe comprising two sections, each in the form of a channel of different depths at different points in its length, and arranged with their bottoms in engagement and secured together to form a radial stiffening web differently arranged with respect to the center of the shoe at different parts of the shoe.

19. A brake shoe comprising two sections, each in the form of a channel of different depths at different points in its length, and arranged with their bottoms in engagement and secured together from one end of the shoe to the other, the different depths of the channels providing a web for the shoe having different lateral positions at different points in the length of the shoe and arranged at one side of the center of the shoe at one end to overlap the end of an adjacent shoe.

20. A brake shoe of metal pressed to form a central web with a continuous flange extending entirely around its edge and of cylindrical form in one part to form the shoe face.

21. A brake shoe of metal pressed to form a central web with a continuous flange extending entirely around its edge and of cylindrical form in one part to form the shoe face and depressed below the curve of said face and narrower than said part and extending beyond said face to form a stiffened arcuate pivot arm at the end of the shoe.

22. A brake shoe of metal pressed to form a central web with a continuous flange extending entirely around its edge and of cylindrical form in one part to form the shoe face and being substantially radial at the end of the shoe to receive brake-applying thrust and transmit it to the central web.

23. A pressed brake shoe element generally cup-shaped in form, and having a flat bottom adapted to form part of the radial stiffening web of the shoe, and a continuous flange extending around the edge of said web, that part of the flange along the outer edge of the web being cylindrically curved and of substantial height to form approximately one-half of the friction face of the shoe.

24. A pressed brake shoe element generally arc-shaped lengthwise and having its bottom adapted to form part of the radial stiffening web of the shoe, and having flanges along both the inner and outer edges of said bottom, at least part of the flange along the outer edge being cylindrically curved.

25. A pressed brake shoe element generally cup-shaped in form, and having a flat bottom adapted to form part of the radial stiffening web of the shoe, and a continuous flange extending around the edge of said web, that part of the flange along the outer edge of the web being cylindrically curved and of substantial height to form approximately one-half of the friction face of the shoe, the cup being shallower at one end than throughout the greater part of its length.

In testimony whereof, I affix my signature.

ADIEL Y. DODGE.